United States Patent [19]

Sakata

[11] Patent Number: 4,812,930
[45] Date of Patent: Mar. 14, 1989

[54] TAPE GUIDE ARRANGEMENT FOR A HELICAL SCAN TYPE MAGNETIC RECORD REPRODUCTION DEVICE

[75] Inventor: Haruo Sakata, Tokyo, Japan

[73] Assignee: Clarion Co., Ltd., Tokyo, Japan

[21] Appl. No.: 18,101

[22] Filed: Feb. 20, 1987

[30] Foreign Application Priority Data

Mar. 6, 1986 [JP] Japan .................................. 61-49888

[51] Int. Cl.$^4$ ............................................. G11B 15/61
[52] U.S. Cl. ........................................................ 360/84
[58] Field of Search .................................... 360/84, 85

[56] References Cited

U.S. PATENT DOCUMENTS

| | | | |
|---|---|---|---|
| 3,679,840 | 7/1972 | Maxey | 360/84 |
| 4,215,379 | 7/1980 | Lemelson | 360/85 |
| 4,369,473 | 1/1983 | Eibensteiner | 360/84 |
| 4,556,922 | 12/1985 | Erhart | 360/85 |
| 4,665,450 | 5/1987 | Hirano | 360/85 |

*Primary Examiner*—Robert S. Tupper
*Attorney, Agent, or Firm*—Flynn, Thiel, Boutell & Tanis

[57] ABSTRACT

A magnetic recording reproduction device is disclosed, in which the rotation axis of the motor is disposed substantially parallelly to the base plate and the diameter of the drum holding rotary heads is reduced to a half of that utilized heretofore, owing to a construction of the tape driving system, by which the tape is wound around the drum after having been bent approximately by 90° and twisted approximately by 90°.

13 Claims, 5 Drawing Sheets d=30mm d=15mm

TAPE GUIDE ARRANGEMENT FOR A HELICAL SCAN TYPE MAGNETIC RECORD REPRODUCTION DEVICE

FIELD OF THE INVENTION

This invention relates to a magnetic record reproduction device, and in particular to a rotary head type digital audio tape recorder (hereinbelow abbreviated to R-DAT ), in which the tape is drawn out from the cassette at the recording/reproduction.

BACKGROUND OF THE INVENTION

FIG. 6 is a scheme illustrating the track pattern on a magnetic tape, on which information is recorded/reproduced by an R-DAT, and FIG. 7 is a top view of a usual tape driving system of the R-DAT, in which the reference numeral 1 is an arrow indicating the movement direction of the tape; 2 is an arrow indicating the movement direction of the rotary head; 3 is a reference edge; 4, 4' are selection tracks; 5, 5' are track guards; $6_1$, $6_2$ are main tracks; 7 is a cassette; 8 is a drum; 9 is a capstan; and 10 represents the tape.

As indicated in the figures, two heads on the drum 8 record two tracks $6_1$, $6_2$ for every rotation of the drum 8 and inversely, at the reproduction, the two tracks $6_1$, $6_2$ are reproduced for every rotation of the drum 8. Although here it is supposed that the number of heads is 2, it is only the track pattern indicated in FIG. 6 that is determined by the standard. As indicated in FIG. 7, the tape 10 is wound around the drum 8 over 90°.

The diamater of the drum is determined to be d=30 mm, but when it is d=15 mm, which is a half thereof, the winding angle is changed from the prior art winding angle of 90° to 180°, as indicated in FIG. 8, and thus the drum may be made more slender. In order to make the R-DAT more convenient for carrying it, it is necessary to make it smaller and inevitable to make it thinner. However, only if the diameter d is changed to 15 mm, as indicated in FIG. 8, although it can be made smaller in the direction perpendicular to the axis 11' of the motor 11, its thickness in the direction parallel to the axis 11' of the drum 8 and the motor 11 cannot be reduced.

OBJECT OF THE INVENTION

The object of this invention is to provide a tape driving system for an R-DAT, for which the diameter of the drum holding the rotary head is reduced to a half of that according to the prior art techniques and in addition the thickness described above is reduced.

SUMMARY OF THE INVENTION

In order to achieve this object, a magnetic recording reproduction device, according to this invention, in which signals are recorded/reproduced by means of at least two rotary heads mounted on a drum rotated by a motor on a magnetic tape driven while being wound around the drum, comprises means for bending the tape approximately by 90° and at the same time twisting it approximately by 90° at the entrance side and at the exit side of the drum.

Since the diameter of the drum is reduced to a half and the rotation axis of the drum and the motor is disposed substantially parallelly to the base plate of the device, it is possible to realize a thin type R-DAT.

DETAILED DESCRIPTION

Figure 1A:
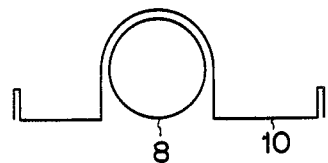
FIGS. 1 (a), (b) and (c) are schemes showing the basic construction of a tape driving system according to this invention; (a), (b) and (c) being a top view, a side view and a perspective view, respectively.
Figure 1B:
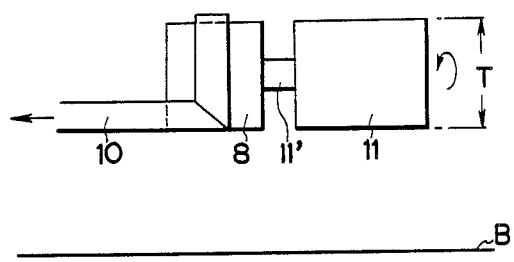
Figure 1C:
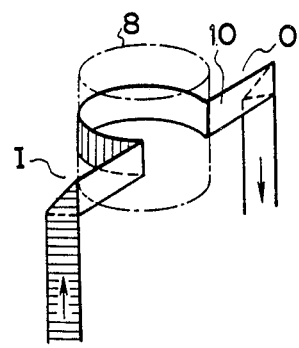
Figure 9A:
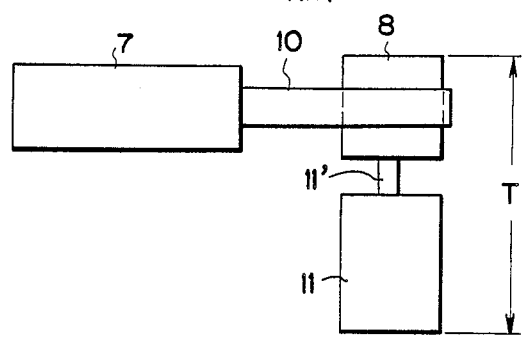
FIGS. 9 (a) and (b) indicate the arrangement of a cassette, the drum and the motor in a prior art R-DAT.
Figure 9B:
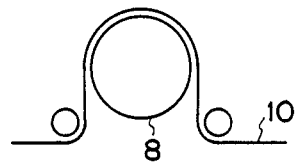

FIGS. 1 (a), (b) and (c) are schemes showing the basic construction of a tape driving system according to this invention; (a), (b) and (c) being a top view, a side view and a perspective view, respectively, illustrating a tape 10 wound around the drum. in FIGS. 1 (a), (b) and (c), the axis 11' of the drum 8 and the motor 11 is disposed substantially parallelly to the base plate B such as a chassis of the R-DAT and the tape is wound around the drum after having been folded as stated later. With respect to the device indicated in FIG. 9, since the thickness T is determined by the diameter of the drum 8 or the motor 11, a slender motor 11 giving a required torque can be used without any influences on the thickness T.

Figures 2A, 2B, 2C:
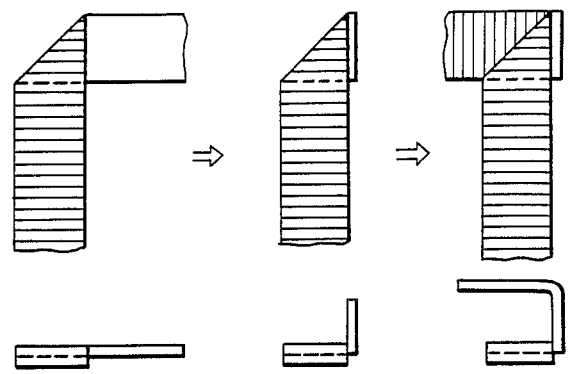
FIGS. 2 (a), (b) and (c) are schemes for explaining the movement of the tape.

FIGS. 2 (a), (b) and (c) are schemes for explaining the method for folding the tape 10 on the entrance side I and the exit side 0 of the drum 8, when the tape 10 is wound around the drum 8. As illustrated in FIG. 2 (a), the tape is folded once at a right angle. Then, as illustrated in FIG. 2 (b), the tape is bent again by 90° so that the direction of the movement of the tape is perpendicular to the initial surface of the tape. FIG. 2 (c) shows the tape bent still again in order to wind it around the drum. It is possible to reduce the thickness T of the tape driving system in the reproduction device by winding the tape 10 around the drum 8 in this way, as indicated in FIG. 1 (c).

Figure 3:
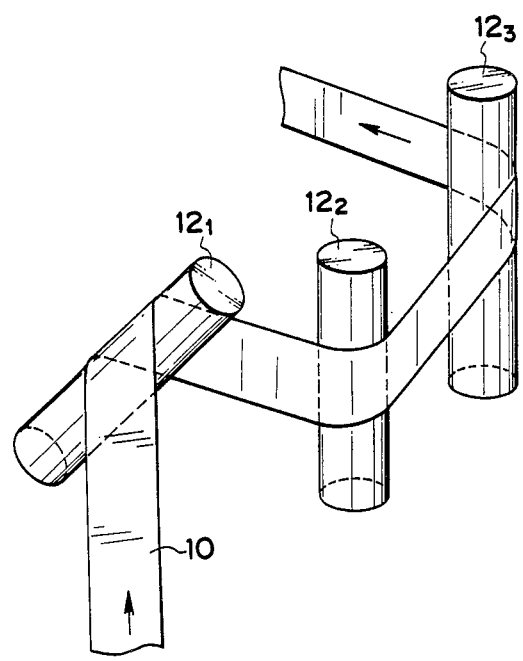
FIG. 3 is a perspective view of a post guide and the tape.

However, if the tape is moved in practice in the state indicated in FIG. 1, since the tape is folded and the radius of curvature of the tape is small, the life thereof is short and the torque of the capstan motor required for the movement of the tape should be consiserably great. In order to remove this difficulty, cylindrical post guide mechanisms $12_1$, $12_2$ and $12_3$ are located at the positions, where the tape is folded, i.e. at the entrance side I and at the exit side 0 of the drum 8 in FIG. 1 (c), as indicated in FIG. 3. These post guide mechanisms $12_1$, $12_2$ and $12_3$ can be either fixed or rotatable and they are disposed for realizing the folding of the tape as indicated in FIG. 2 (c). Owing to these mechanisms, the radius of curvature of the tape at the folding is made greater, the tape moves smoothly, a weak force may be sufficient for the movement of the tape, and the life of the tape may be elongated.

Figure 4A:
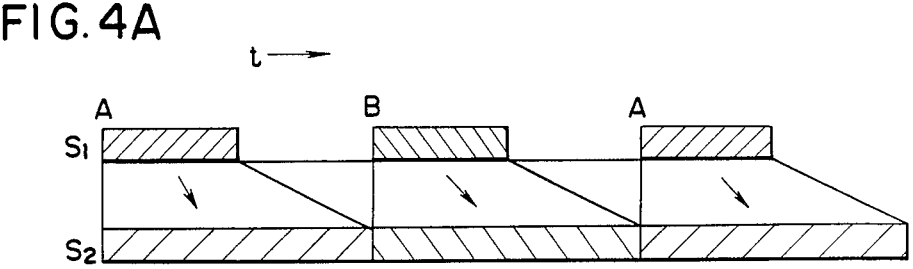
FIGS. 4 (a) and (b) show the distribution of reproduced signals on the time axis.
Figure 4B:
Figure 6:
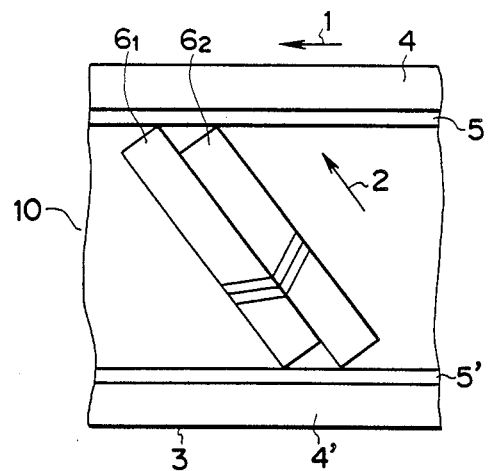
FIG. 6 illustrates the track pattern of the R-DAT.
Figure 7:
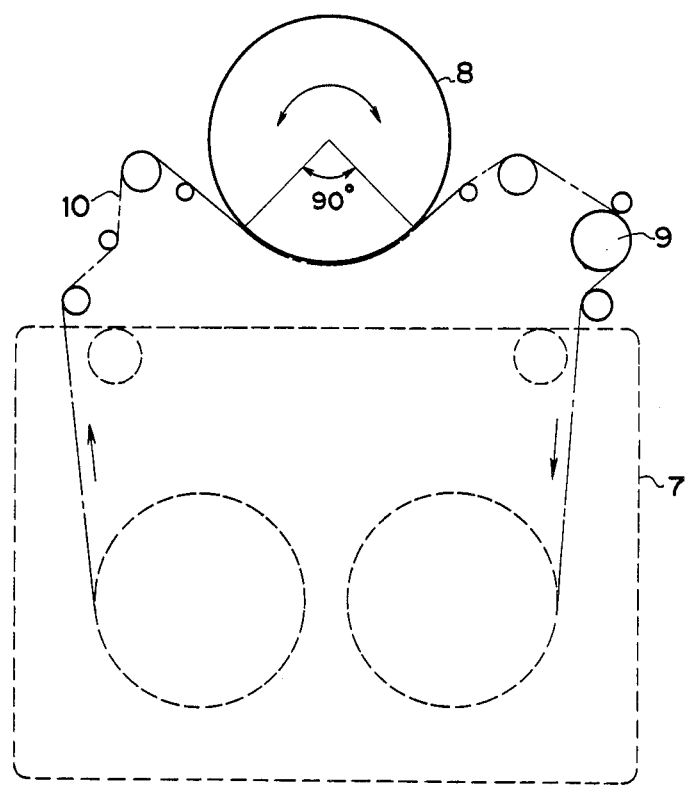
FIG. 7 illustrates the tape driving mechanism and the movement of the tape in a prior art R-DAT.
Figure 8A:
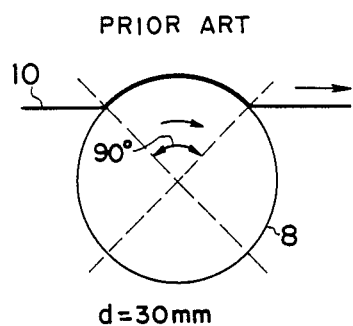
FIGS. 8 (a) and (b) are schemes for explaining the difference in the winding angle between the prior art system and the system according to this invention.
Figure 8B:
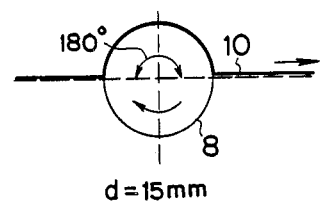

Owing to the tape movement system described above, an effect stated later can be obtained by reducing the diamater of the drum to ½, as indicated in FIG. 8 (b). It is supposed that the rotation number of the drum is 2000 rpm, which is identical to that according to the prior art techniques. FIGS. 4 (a) and (b) show the distribution of reproduced signals on the time axis. FIG. 4 (a) indicates variations of the signal obtained according to the prior art techniques, in the case where the track pattern indicated in FIG. 6 is read out by means of the two heads A and B mounted on the drum, the winding angle is 90°, and the heads A and B are located so as to be opposed to each other, i.e. at two angular positions which are separated by 180°. As indicated in the upper portion of FIG. 4 (a), since the output of a reproduction head corresponds to 90° which is the winding angle, in 180° which is the rotation angle, the reproduced signal $S_1$ is intermittent on the time axis. This intermittent signal is once recorded for 90° in a memory, as indicated by arrows, and read out in a period of time correponding to 180°, i.e. with a clock frequency, which is ½ of the clock frequency at the recording in the memory. By this or another equivalent method the reproduced signal $S_2$ is obtained, for which the time axis is stretched twice with respect to that for the reproduced signal $S_1$. FIG. 4 (b) shows the reproduced signal according to the method of this invention, for which the stretch of the time axis is basically unnecessary. The output $S_3$ of the reproduction heads is continuous, as indicated in the figure, and it is sufficient only to draw out the reproduced signal $S_3$ after having stored it once in a memory, in order to absorb the time axis variation component (jitter) accompanied by the recording/reproduction to/from the magnetic tape.

Figure 5:
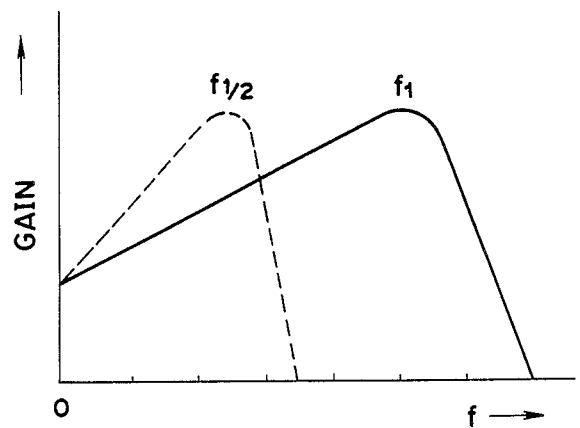
FIG. 5 shows frequency characteristics.

FIG. 5 shows frequency characteristics of the transmission system for the reproduced signal. The full line indicates the characteristics of the transmission band for the reproduced signal according to the prior art techniques. To stretch these characteristics twice with respect to the time axis by means of a memory corresponds to the fact that the frequency axis is shortened to ½, as indicated by the broken line in FIG. 5. Since a reproduction system having the frequency characteristics indicated by the broken line is sufficient, the method of this invention is advantageous in the S/N ratio of the preamplifier in the reproduction system (generally the S/N ratio in an electro-magnetic transformation is lowered for the high frequency).

The construction according to this invention can be used also for the recording. Since the band of the recording system can be made narrower and the frequency region, where recording characteristics are good, in used, it is possible to ameliorate the whole S/N ratio of the signal.

As explained above, according to this invention, the following advantages can be obtained:

(i) The rotary drum can be made more slender and at the same time the device can be made thinner, because the tape is wound around the drum after having been folded at 90°. A slender motor driving the drum is used, what doesn't increase the thickness.

(ii) Since the tape winding angle is increased from 90° to 180°, the stretching of the time axis for the output of the reproduction heads is unnecessary. For this reason the memory for stretching the time axis is not required ponent, this memory may have a small capacity with respect to the memory for stretching the time axis.

(iii) Since the band of the reproduced signal is narrow (½ of that according to the prior art techniques), it is possible to increase the S/N ratio of the preamplifier for the reproduction.

It is further understood by those skilled in the art that the foregoing description is a preferred embodiment of the disclosed device and that various changes and modifications may be made in the invention without departing from the spirit and scope thereof.

I claim:

1. In a magnetic recording reproduction device, in which signals are recorded/reproduced on a magnetic tape by means of at least two heads provided on a drum rotated by a motor, the magnetic tape being supported for lengthwise movement and extending around a portion of said drum, the improvement comprising wherein a rotation axis of said drum is disposed substantially parallel to a base plate of said device, including first means for bending a portion of the tape traveling to said drum in a first direction extending substantially parallel to said rotation axis of said drum approximately by 90° so that it is traveling in a second direction approximately normal to said first direction and for then twisting the tape approximately by 90° so that it is traveling in a third direction approximately normal to said second direction, the tape then traveling around said portion of said drum, and including second means for twisting the tape from said drum which is traveling in a fourth direction approximately by 90° so that it is traveling in a fifth direction approximately normal to said fourth direction and for then bending the tape approximately by 90° so that it is traveling in a sixth direction approximately normal to said fifth direction.

2. A magnetic recording reproduction device according to claim 1, in which the tape travels approximately 180° about said axis on said portion of said drum.

3. An apparatus comprising: a cylindrical drum which is supported for rotation about an axis and which has thereon at least one head, and guide means for causing an elongate and lengthwise movable magnetic tape to travel along a path of travel extending in a first direction to a first location spaced from said drum, then in a second direction from said first location toward said drum, then around a portion of said drum, then in a third direction away from said drum to a second location spaced from said drum, and then in a fourth direction away from said second location; wherein said guide means includes first means cooperable with the tape in the region of said first location for redirecting the tape from travel in said first direction to travel in said second direction, said second direction being approximately parallel to a plane perpendicular to said axis and said first direction being at an angle with respect to said plane, and second means cooperable with the tape in the region of said second location for redirecting the tape from travel in said third direction to travel in said fourth direction, said third direction being approximately parallel to said plane and said fourth direction being at an angle with respect to said plane; and wherein said first and fourth directions are parallel to said axis, and said fourth direction is opposite to said first direction.

4. The apparatus according to claim 3, wherein said first means includes means for redirecting the tape from travel in said first direction so that it is traveling in a fifth direction so that it is traveling in a sixth direction substantially perpendicular to said second and fifth directions, and for thereafter redirecting the tape traveling in said sixth direction so that it is traveling in said second direction.

5. The apparatus of claim 4, wherein said first means includes first, second and third guide members arranged so that the tape successively passes over them, said first guide member effecting said redirection of the tape from said first direction to said fifth direction, said second guide member effecting said redirection of the tape from said fifth direction to said sixth direction, and said third guide member effecting said redirection of the tape from said sixth direction to said second direction.

6. The apparatus according to claim 5, wherein said first, second and third guide members are cylindrical, said second and third guide members having axes which extend parallel to said axis of rotation of said drum and said first guide member having an axis which is skewed with respect to said axes of said second and third guide members.

7. The apparatus according to claim 6, wherein said first, second and third guide members are each a stationary cylindrical post.

8. The apparatus according to claim 6, wherein each of said cylindrical guide members is rotatably supported.

9. The apparatus according to claim 3, wherein said second means includes means for redirecting the tape from travel in said third direction so that it is traveling in a fifth direction substantially perpendicular to said third direction, for thereafter redirecting the tape traveling in said fifth direction so that it is traveling in a sixth direction substantially parallel to said third direction, and for thereafter redirecting the tape traveling in said sixth direction so that it is traveling in said fourth direction substantially perpendicular to said sixth direction.

10. The apparatus of claim 9, wherein said second means includes first, second and third guide members arranged so that the tape successively passes over them, said first guide member effecting said redirection of the tape from said third direction to said fifth direction, said second guide members effecting said redirection of the tape from said fifth direction to said sixth direction, and said third guide member effecting said redirection of the tape from said sixth direction to said fourth direction.

11. The apparatus according to claim 10, wherein said first, second and third guide members are cylindrical, said first and second guide members having axes which extend parallel to said axis of rotation of said drum and said third guide member having an axis which is skewed with respect to said axes of said first and second guide members.

12. The apparatus according to claim 11, wherein said first, second and third guide members are each a stationary cylindrical post.

13. The apparatus according to claim 11, wherein each of said cylindrical guide members is rotatably supported.

* * * * *